(12) United States Patent
Mensing et al.

(10) Patent No.: US 10,243,599 B2
(45) Date of Patent: Mar. 26, 2019

(54) DETERMINATION DEVICE AND METHOD FOR DETERMINING AN ACTIVE CHANNEL OF A PLURALITY OF CHANNELS

(71) Applicant: Rohde & Schwarz GmbH & Co. KG, München (DE)

(72) Inventors: Christian Mensing, München (DE); Stefan Schmidt, München (DE)

(73) Assignee: ROHDE & SCHWARZ GMBH & CO. KG, Munich (DE)

( * ) Notice: Subject to any disclaimer, the term of this patent is extended or adjusted under 35 U.S.C. 154(b) by 168 days.

(21) Appl. No.: 15/360,785

(22) Filed: Nov. 23, 2016

(65) Prior Publication Data

US 2018/0035464 A1 Feb. 1, 2018

Related U.S. Application Data

(60) Provisional application No. 62/368,242, filed on Jul. 29, 2016.

(51) Int. Cl.
*H04W 4/00* (2018.01)
*H04B 1/10* (2006.01)
*H04B 1/06* (2006.01)

(52) U.S. Cl.
CPC ............ *H04B 1/1027* (2013.01); *H04B 1/06* (2013.01)

(58) Field of Classification Search
None
See application file for complete search history.

(56) References Cited

U.S. PATENT DOCUMENTS

| 2006/0140314 | A1* | 6/2006 | Kim ..................... H04B 1/7077 375/343 |
| 2012/0063372 | A1* | 3/2012 | Steer .................... H04B 1/0028 370/280 |
| 2012/0129480 | A1* | 5/2012 | Ruelke .................. H04B 1/001 455/296 |
| 2012/0240005 | A1* | 9/2012 | Choi ....................... H04H 20/30 714/755 |
| 2015/0223243 | A1* | 8/2015 | Tabet .................. H04W 28/085 370/330 |

OTHER PUBLICATIONS

Dahlman et al., "Chapter 10: Downlink Physical-Layer Processing," 4G LTE/LTE-Advanced for Mobile Broadband, American Press, pp. 143-202 (2011).

* cited by examiner

*Primary Examiner* — Phirin Sam
(74) *Attorney, Agent, or Firm* — Shumaker & Sieffert, P.A.

(57) ABSTRACT

A determination device serves for determining an active channel of a plurality of channels in a wireless signal, wherein adjacent channels overlap each other by a predetermined frequency threshold. The determination device comprises a receiver for receiving the wireless signal and providing a respective digitized signal, a first filter for applying a mean filter to the digitized signal, and a detector for detecting the active channel in the first filtered signal.

19 Claims, 5 Drawing Sheets

DETERMINATION DEVICE AND METHOD FOR DETERMINING AN ACTIVE CHANNEL OF A PLURALITY OF CHANNELS

PRIORITY CLAIM

This application claims the benefit of U.S. Provisional Patent Application Ser. No. 62/368,242, filed Jul. 29, 2016; the disclosure of which is incorporated herein by reference in its entirety.

TECHNICAL FIELD

The invention relates to a determination device for determining an active channel of a plurality of channels in a wireless signal, wherein adjacent channels overlap each other by a predetermined frequency threshold. Further, the invention relates to a respective method.

BACKGROUND

Although applicable to any system that uses wireless signals in specific channels for data transmission, the present invention will mainly be described in combination with long term evolution (LTE) networks, and especially with the enhanced machine type communication (eMTC) variant of LTE networks.

In modern wireless communication networks, devices can be assigned different channels. It is therefore necessary to know which channel a device uses, especially for test equipment.

An active channel can e.g. be determined by listening in on every single channel in succession and determining whether a signal can be received on the channel or not. This scheme can be compared to the channel search of television sets. However, this scheme requires a tuner in the receiver and is time consuming.

Accordingly, there is a need for better channel detection.

SUMMARY

A determination device for determining an active channel of a plurality of channels in a wireless signal, wherein adjacent channels overlap each other by a predetermined frequency threshold, comprises a receiver for receiving the wireless signal and providing a respective digitized signal, a first filter for applying a mean filter to the digitized signal, and a detector for detecting the active channel in the first filtered signal.

A method for determining an active channel of a plurality of channels in a wireless signal, wherein adjacent channels overlap each other by a predetermined frequency threshold, comprises digitizing the received wireless signal and providing a respective digitized signal, applying a mean filter to the digitized signal and providing a first filtered signal, and detecting the active channel in the first filtered signal.

In modern communication systems like eMTC based LTE communication networks, the single channels, which a device can use for communication, are not separated or adjacent to each other. Instead, in such networks the channels can overlap each other, comprising only a predetermined margin between the channel boundaries. Other possible wireless networks can e.g. be universal mobile telecommunications standard (UMTS) networks, so called 5G networks, wireless local area network (WLAN) networks or any other wireless data network.

For example, in eMTC LTE networks every PRACH channel comprises six so called resource blocks and every resource block is 180 kHz wide. A physical random access channel (PRACH) channel therefore is 1.08 MHz wide. The predetermined minimum margin between the PRACH channel boundaries is exactly one resource block, i.e. 180 kHz. This implies that the resource blocks overlap by five resource blocks, i.e. 900 kHz.

The present invention provides a solution for identify the respective active channel without receiving and decoding the complete wireless signal, even with overlapping channels.

The filter of the present invention will provide a mean filtered signal. There can e.g. be a predetermined amount of samples or frames each comprising a predetermined number of samples, which the receiver will receive. The filter can than calculate a mean for the respective samples or frames, which can then be further processed by the detector.

The number of frames can e.g. depend on the contents of the signal, which is to be analyzed. The number of samples per frame can e.g. also depend on the contents of the signal. However, the number of samples can also depend on the further processing steps.

By creating a mean filtered signal, the present invention increases the resolution, with which the single channels can be detected and allows identifying the active channel with high accuracy.

Further embodiments of the present invention are subject of the further subclaims and of the following description, referring to the drawings.

In a possible embodiment, the first filter can comprise a summing unit for sample-wise summing frames of the digitized signal of a predetermined frame length. The frames can each e.g. have a number of samples, which corresponds to the width of the consecutive signal stages. That means e.g. that if the detector works with frames of 1024 samples, the frames used by the summing unit will also have a width of 1024 samples. The frames can e.g. exist just logically. For example, the receiver can output a stream of samples and the first filter can divide this stream into frames according to the predetermined frame length. Sample-wise in this context, means that the corresponding samples of every frame will be summed and the result will be a single frame of the predetermined frame length. That means that the summing unit sums the first samples of all frames in the first sample of the resulting frame, the second samples in the second sample of the resulting frame and so on. The result is that the first filter provides the detector with a single frame comprising the predetermined number of samples.

In a possible embodiment, the determination device can comprise a Fourier transformer, and the predetermined frame length can be equal to the window size in samples of the Fourier transformer. The Fourier transformer can e.g. be a Fast Fourier transformer, FFT, which can be efficiently implemented. The Fourier transform can e.g. be performed according to the following formula:

$$X(k) = \sum_{n=0}^{N_{DFT}-1} x(n) * \exp\left(-j*2*\pi*\left(k+\left\lceil\frac{N_{DFT}}{2}\right\rceil\right)*\frac{n}{N_{DFT}}\right)$$

$X(k)$ is the signal in the frequency domain, $x(n)$ is the signal in the time domain, k is the frequency index and $N_{DFT}$ is the windows length of the discrete Fourier transform, which is used.

In a possible embodiment, the first filter can comprise a divider for dividing the value of the individual samples of the sample-wise summed frames by the number of summed frames. Simply adding up the values of the individual samples is sufficient for further processing and can be seen as a mean value calculation in the context of the present patent application. However, by dividing through the number of summed frames the real mean value can be calculated.

In a possible embodiment, the transformer can transform the first filtered signal into the frequency domain and can provide the transformed signal to the detector. Here, the digitized signal is first filtered in the time domain and then transformed into the frequency domain. Only the detector will work with a signal in the frequency domain. Filtering in the time domain can be done efficiently simply by summing up single samples.

In a possible embodiment, the transformer can transform the digitized signal into the frequency domain and can provide the transformed digitized signal to the first filter. In this second variant, the digitized signal is transformed into the frequency domain directly after the wireless signal is received and digitized. All further processing is then performed in the frequency domain.

Since the Fourier transform is a linear transform it does not matter whether averaging is performed in time or in frequency domain.

In a possible embodiment, the receiver can comprise a signal input coupled to an analog to digital converter of the receiver for transforming the received signal into a digitized signal at a predetermined sample rate. The predetermined sample rate can e.g. be at least the double of the maximum Frequency that has to be detected. The frequency that has to be detected can e.g. be a frequency of about 20 to 40 MHz, especially 30 MHz or 30.72 MHz. However, it is understood that the frequencies at the signal input, e.g. a RF connector, can be much higher, e.g. in the GHz range. The signal can then be passed through any number of mixing stages, analog to digital converters and re-samplers, or the like, until the signal with the respective frequency is acquired.

In a possible embodiment, the receiver can comprise an analyzer for analyzing the wireless signal and providing a digitized signal comprising I/Q sampled values.

In a possible embodiment, the analyzer can provide only the algebraic signs of the I and Q components of the I/Q samples, and the first filter and the detector can work based on the algebraic signs instead of the complete samples. This provides a much more memory efficient way of handling the digitized wireless signal (1 Bit per sample and per I and Q component), and also provides robust channel detection results.

In a possible embodiment, the detector can comprise a multiplier for multiplying every sample in the first filtered signal by its complex conjugate value and providing the multiplied signal. The multiplied signal can also be said to comprise the power values of the single samples. In any case, the multiplied signal comprises only positive values. Further, prior to multiplying the samples the filtered or transformed signal can be stored or buffered in a memory.

In a possible embodiment, the detector can comprise a second filter for filtering the multiplied signal and providing a second filtered signal. The filter can e.g. be a moving-average filter. The moving-average filter can e.g. be applied to the sample-wise summed frame, which is transmitted in one embodiment to the detector. The moving-average filter can e.g. be provided according to the following formula:

$$Y(k) = \begin{cases} 0 & 0 \le k < L-1 \\ \sum_{r=0}^{L-1} |X|^2(k-r) & L-1 \le k \le N_{DFT}-1 \end{cases}$$

In a possible embodiment, the detector can comprise a maximum determination unit for determining at least one frequency index of at least one maximum of the second filtered signal. The second filtered signal will usually only comprise a single maximum if a wireless signal of only one device is analyzed. However, if the wireless signal is an overlay of signals emitted by a plurality, e.g. more than one, of devices, one maximum may be determined for every device.

In a possible embodiment, the detector can comprise a channel determiner, which based on the determined frequency index or indices determines the active channel or channels. The channel determiner can e.g. be provided in the form of a look-up table, where the frequency index is used as the table index and the value of the respective cell of the table comprises the number of the active channel. Further, a second table can be provided, which provides for every channel the respective frequency. Again, the second table can be provided as a look-up table, where the channel number is used as the index and the value of the respective cell comprises the frequency value for the respective channel. Providing two different tables can save memory needed to store the tables. If for example, there exist six channels, and the predetermined frame length is 1024 samples, a 3 bit value has to be stored 1024 times in the first look-up table. The second look-up table then only needs to have six entries, one for every channel. Therefore, the second look-up table can e.g. comprise 6*32 bit if the frequency value is stored in a 32 bit value. The alternative is to store 1024 times the respective frequency in the first look-up table, i.e. 1024*32 bit.

In a possible embodiment, the wireless signal can be a LTE signal and the active channel is a LTE PRACH channel.

The subject matter described herein may be implemented in hardware, software, firmware, or any combination thereof. As such, the terms "function" "node" or "module" as used herein refer to hardware, which may also include software and/or firmware components, for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

For a more complete understanding of the present invention and advantages thereof, reference is now made to the following description taken in conjunction with the accompanying drawings. The invention is explained in more detail below using exemplary embodiments, which are specified in the schematic figures of the drawings, in which.

In the figures like reference signs denote like elements unless stated otherwise.

DETAILED DESCRIPTION OF THE DRAWINGS

Figure 1:
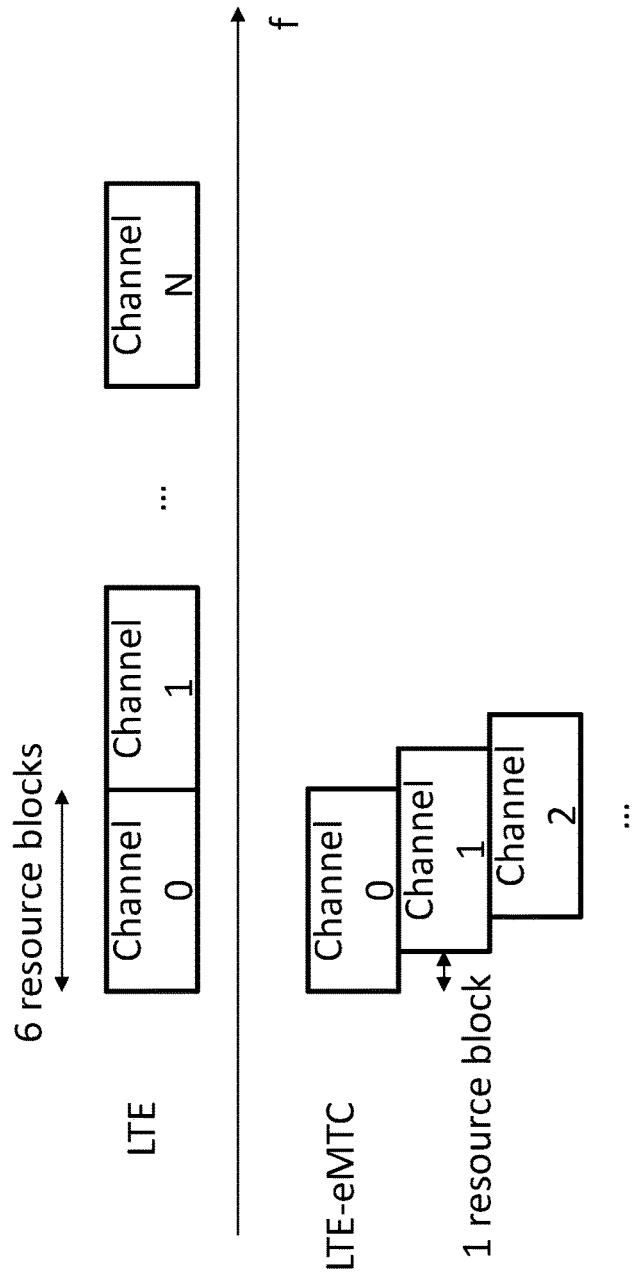
FIG. 1 shows an arrangement of LTE channels in a frequency diagram.

FIG. 1 shows a channel arrangement for PRACH sequence of a legacy LTE system and of a LTE-eMTC system. For the legacy LTE system the single PRACH channels, also called "Ranges" or "Frequency Ranges", are arranged sequentially. That means that in the frequency domain the single PRACH channels do not overlap and the consecutive PRACH channel starts at a frequency, which is not part of the frequency range of the previous PRACH channel.

In LTE systems, legacy and eMTC, the PRACH channel width in the frequency domain is defined by the so-called resource blocks. Every resource block is specified to be 180 kHz wide. A single PRACH channel comprises six resource blocks and therefore 6*180 kHz, i.e. 1.08 MHz.

In contrast to a legacy LTE system, as can be seen in the lower section of FIG. 1, in LTE-eMTC systems, the single PRACH channels can overlap each other. The minimum difference in the starting frequency of consecutive PRACH channels is exactly one resource block, i.e. 180 kHz.

Thus, in LTE-eMTC systems, an improved resolution is necessary to be able to identify the single channels, which overlap in the frequency domain.

Figure 2:
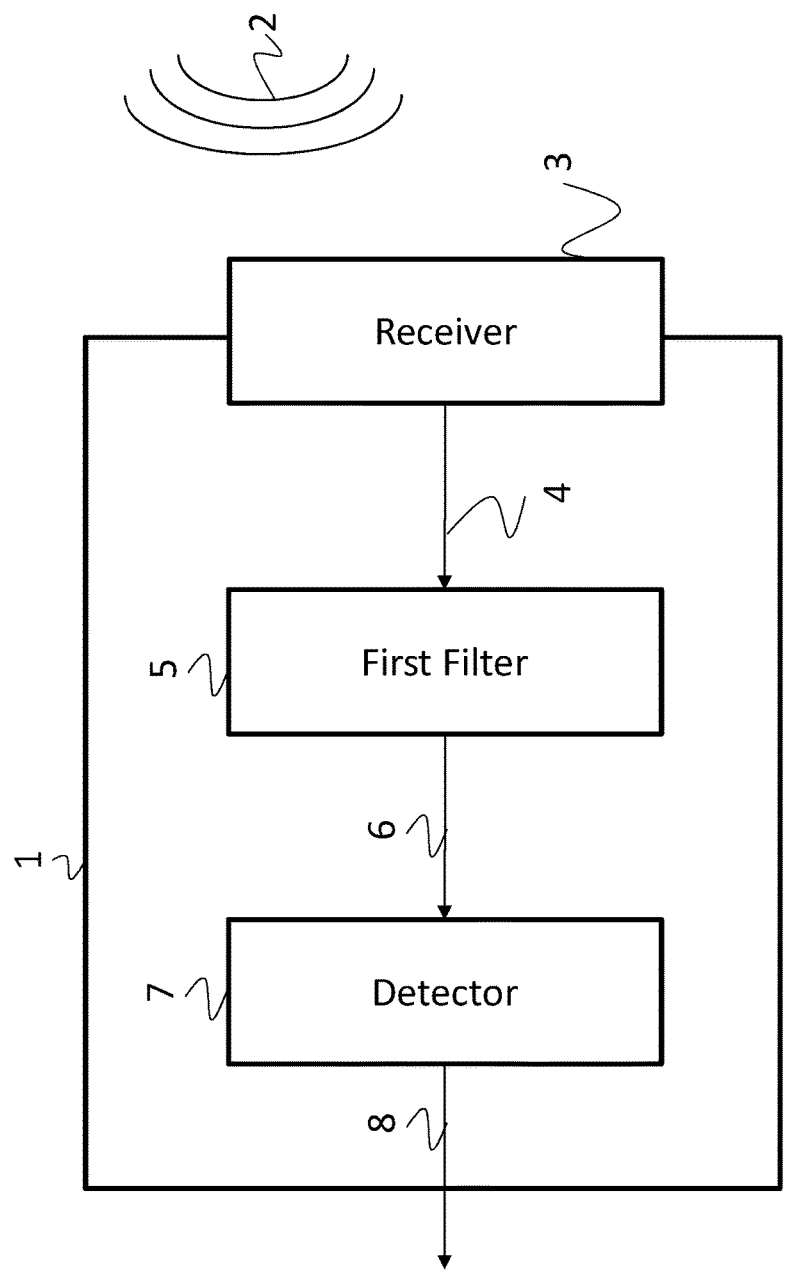
FIG. 2 shows a block diagram of an exemplary embodiment of a determination device according to an embodiment of the present invention.

Therefore, the present invention provides a determination device 1 as shown in FIG. 2, which provides the ability to differentiate between the single PRACH channels of an LTE-eMTC signal 2. It is to be understood, that the LTE-eMTC signal is just exemplarily used. The determination device 1 can therefore be also applied to other networking systems, like UMTS networks, so called 5G networks, WLAN networks or any other wireless data network. The signal 2 can e.g. be emitted by a device under test, DUT (not explicitly shown).

The detection device 1 comprises a receiver 3, which receives the wireless signal 2 and provides a respective digitized signal 4 to a first filter 5. The first filter 5 applies a mean filter to the digitized signal 4 and provides the filtered signal 6 to a detector 7. Finally, the detector 7 uses the filtered signal 6 to detect the channel 8, which the signal 2 uses.

The above described determination device 1 therefore allows determining the channel e.g. of a LTE-eMTC signal, e.g. the respective PRACH sequence, without the need to decode the complete signal.

The first filter 5 can e.g. simply sum up the single samples of signal frames of the digitized signal 4, this will be explained in detail with reference to FIG. 3. A division by the number of summed samples is possible but not necessary. Further, the processing of the filtered signal 6 or the digitized signal 4 can be performed in the frequency domain, as will also be described in depth with reference to FIG. 3 below.

The detector 7 can generally work based on a power analysis of the filtered signal 6 and detect the frequency with a maximum in transmitted power to determine the respective channel 8.

Figure 3:
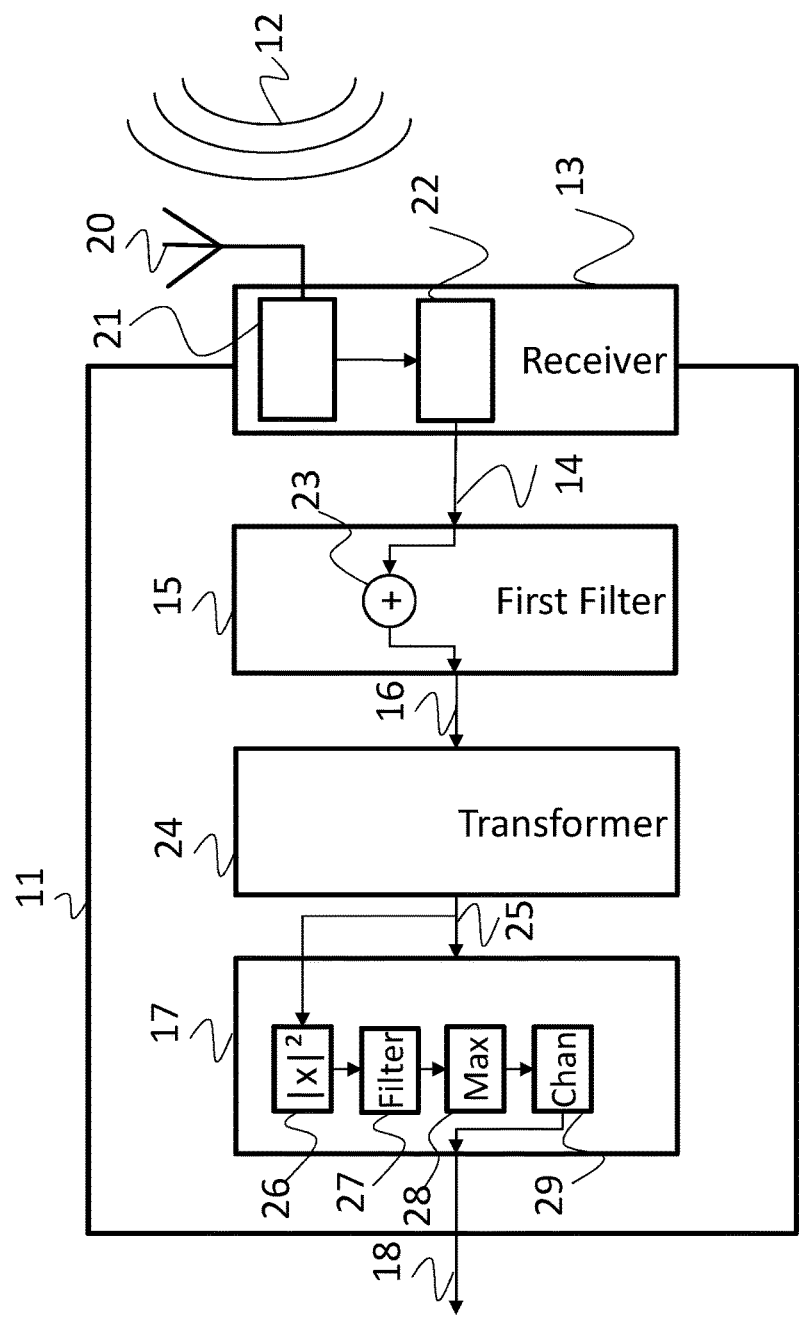
FIG. 3 shows a block diagram of another exemplary embodiment of a determination device according to an embodiment of the present invention.

The determination device 11 of FIG. 3 is based on the determination device 1 of FIG. 2, and comprises additional elements.

The receiver 13 comprises an antenna 20 to receive the wireless signal 12. It also possible to provide the receiver 13 with a connector instead of the antenna 20. In such an embodiment, the DUT is connected via a cable to the receiver 13. The antenna 20 provides the received signal to an analog to digital converter 21, which converts the received analog wireless signal 12 into a digital signal, which represents the content of the analog signal. The analog to digital converter provides the converted signal to an analyzer 22, which extracts respective I/Q samples from the converted signal and provides a respective digitized signal 14 to the first filter 15. The analyzer 22 can in one embodiment also extract only the arithmetic signs of the I and Q components, i.e. + or −, positive or negative, and provide only the signs of the I/Q samples instead of the I/Q samples themselves. The further stages can work with both, I/Q samples or the arithmetic signs, the same way.

Figure 5:
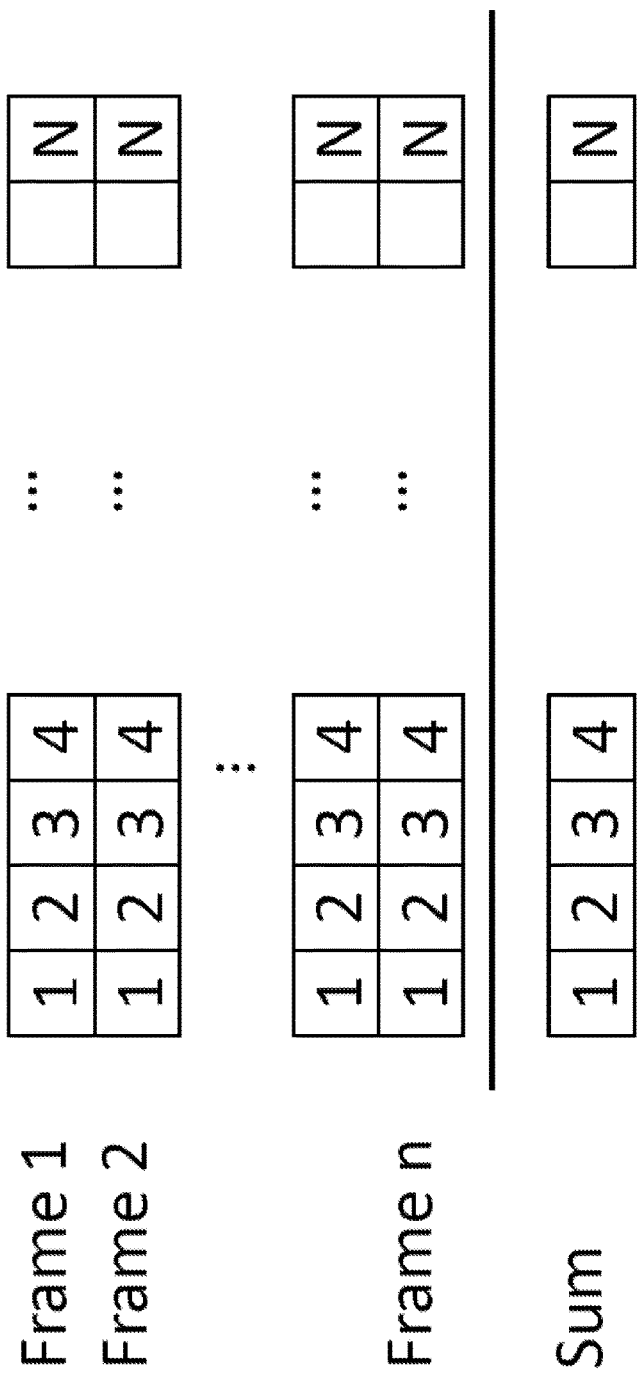
FIG. 5 shows a conceptual diagram of a frame coding scheme.

The first filter 15 comprises a summing unit 23, which sums up the single samples of signal frames of the digitized signal 14 sample-wise. The single frames can exemplarily comprise 1024 samples. The number of frames can be predetermined according to the wireless signal 12 and its contents. For an exemplary PRACH sequence in an LTE-eMTC system the number of frames can e.g. be 24. The summing unit will therefore sum up 24 frames sample by sample according to the scheme of FIG. 5.

That means that the first filter 15 will only provide one single frame in the filtered signal 16 to the transformer 24. The transformer 24 is in this example a fast Fourier transformer, FFT, in this case with the same window size as the frame size, i.e. 1024 samples. The FFT can also be performed prior to the filtering in one embodiment.

In the detector 17, a multiplier 26 multiplies every single sample in the transformed signal 25 with its complex conjugate, i.e. it squares the absolute values of the single samples. The single frame with the squared sample values is then filtered by a second filter 27, e.g. an average-value filter, especially a moving-average filter with a given window size, like e.g. 30-40, especially 36. After the second filter 27, the frequency bin representing the maximum signal value is determined by the maximum determination unit 28. Finally, the respective frequency bin is mapped to a respective channel 18 by the channel determiner 29. The channel determiner 29 can e.g. be a look-up table, which has a cell for every frequency bin, in this exemplary case 1024. In the cell, the look-up table stores the respective channel 18.

If the frequency of the respective channel 18 is of interest, a second look-up table can be provided, which comprises one cell for every channel 18. The content of the respective cell is the frequency of the respective channel 18.

Figure 4:
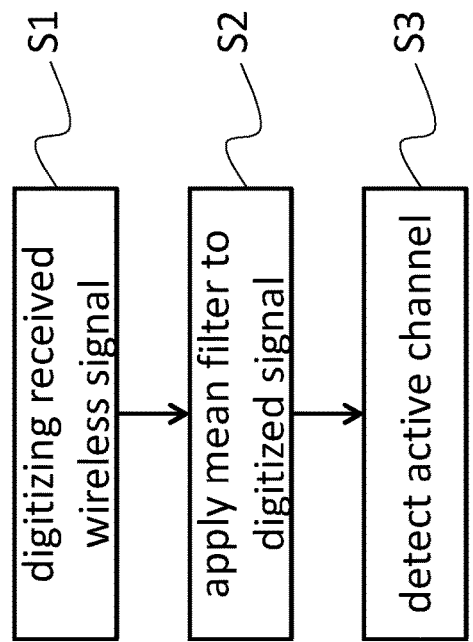
FIG. 4 shows a flow diagram of an exemplary embodiment of a method according to an embodiment of the present invention.

FIG. 4 shows a flow diagram of a method according to the present invention for determining an active channel 8, 18 of a plurality of channels in a wireless signal 2, 12. In the wireless signal 2, 12 adjacent channels overlap each other by a predetermined frequency threshold.

The method starts with receiving and digitizing S1 the wireless signal 2, 12 and providing a respective digitized signal 4, 14. Digitizing can comprise transforming the received signal into a digitized signal 4, 14 with an analog to digital converter at a predetermined sample rate. While transforming the wireless signal 2, 12 can be analyzed and a digitized signal 4, 14 comprising I/Q sampled values or the algebraic signs of the I and Q components of the I/Q samples can be provided.

Further a mean filter is applied S2 to the digitized signal 4, 14, and a respective first filtered signal 6, 16 is provided. Applying S2 the mean filter can e.g. comprise sample-wise summing frames of the digitized signal 4, 14 of a predetermined frame length. It is also possible to divide the values of the individual samples of the sample-wise summed frames by the number of summed frames.

Finally, the active channel 8, 18 is detected S3 in the first filtered signal 6, 16.

The method can also comprise Fourier transforming the digitized signal 4, 14 or the first filtered signal 6, 16 into the frequency domain. The predetermined frame length can in one embodiment be equal to the window size in samples of the Fourier transform.

Finally, detecting can comprises a series of steps starting with multiplying every sample in the first filtered signal 6, 16 or in the transformed signal 25 by its complex conjugate value and providing the multiplied signal. The multiplied signal can then be filtered, e.g. with an average-value filter 27, and a second filtered signal can be provided.

Finally, at least one frequency index or bin of at least one maximum of the second filtered signal can be determined and be mapped to the respective active channel 8, 18 or channels.

While the wireless signal 2, 12 can be a LTE signal and the active channel 8, can be a LTE PRACH channel, the method is not limited to this kind of signal.

Although specific embodiments have been illustrated and described herein, it will be appreciated by those of ordinary skill in the art that a variety of alternate and/or equivalent implementations exist. It should be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein.

In the foregoing detailed description, various features are grouped together in one or more examples or examples for the purpose of streamlining the disclosure. It is understood that the above description is intended to be illustrative, and not restrictive. It is intended to cover all alternatives, modifications and equivalents as may be included within the scope of the invention. Many other examples will be apparent to one skilled in the art upon reviewing the above specification.

It is understood, that embodiments of the present invention can comprise elements, which are embodied in hardware, software or any combination of hardware and software.

Throughout the specification, the terms "including" and "in which" are used as the plain-English equivalents of the respective terms "comprising" and "wherein," respectively. Moreover, the terms "first," "second," and "third," etc., are used merely as labels, and are not intended to impose numerical requirements on or to establish a certain ranking of importance of their objects.

The invention claimed is:

1. A determination device for determining an active channel of a plurality of channels in a wireless signal, wherein adjacent channels overlap each other by a predetermined frequency threshold, the determination device comprising:
a receiver for receiving the wireless signal and providing a respective digitized signal,
a first filter for applying a mean filter to the digitized signal and providing a first filtered signal,
a detector for detecting the active channel in the first filtered signal, the detector comprising a multiplier for multiplying every sample in the first filtered signal by its complex conjugate value and providing the multiplied signal, and a second filter for filtering the multiplied signal and providing a second filtered signal, and a maximum determination unit for determining at least one frequency index of at least one maximum of the second filtered signal.

2. The determination device according to claim 1, the first filter comprising a summing unit for sample-wise summing frames of the digitized signal of a predetermined frame length.

3. The determination device according to claim 2, comprising a Fourier transformer, and the predetermined frame length being equal to the window size in samples of the Fourier transformer.

4. The determination device according to claim 2, the first filter comprising a divider for dividing the value of the individual samples of the sample-wise summed frames by the number of summed frames.

5. The determination device according to claim 3, the transformer transforming the first filtered signal into the frequency domain and providing the transformed signal to the detector, or the transformer transforming the digitized signal into the frequency domain and providing the transformed digitized signal to the first filter.

6. The determination device according to claim 1, the receiver comprising a signal input coupled to an analog to digital converter of the receiver for transforming the received signal into a digitized signal at a predetermined sample rate.

7. The determination device according to claim 6, the receiver comprising an analyzer for analyzing the wireless signal and providing a digitized signal comprising I/Q sampled values.

8. The determination device according to claim 7, the analyzer providing only the algebraic signs of the I and Q components of the I/Q samples, wherein the first filter and the detector work based on the algebraic signs instead of the complete samples.

9. The determination device according to claim 1, the detector comprising a channel determiner, which based on the determined frequency index or indices, determines the active channel or channels.

10. The determination device according to claim 1, wherein the wireless signal is a long term evolution (LTE) or enhanced machine type communications (eMTC) signal and the active channel is a LTE or eMTC physical random access channel (PRACH).

11. A method for determining an active channel of a plurality of channels in a wireless signal, wherein adjacent channels overlap each other by a predetermined frequency threshold, the method comprising:
- digitizing the received wireless signal and providing a respective digitized signal,
- applying a mean filter to the digitized signal and providing a first filtered signal,
- detecting the active channel in the first filtered signal, wherein the detecting comprises multiplying every sample in the first filtered signal by its complex conjugate value and providing the multiplied signal, filtering the multiplied signal and providing a second filtered signal, and determining at least one frequency index of at least one maximum of the second filtered signal.

12. The method according to claim 11, wherein applying a mean filter comprises sample-wise summing frames of the digitized signal of a predetermined frame length.

13. The method according to claim 12, further comprising Fourier transforming the digitized signal or the first filtered signal into the frequency domain, wherein the predetermined frame length is equal to the window size in samples of the Fourier transform.

14. The method according to claim 12, the filtering comprising dividing the value of the individual samples of the sample-wise summed frames by the number of summed frames.

15. The method according to claim 11, wherein receiving comprises transforming the received signal into a digitized signal with an analog to digital converter at a predetermined sample rate.

16. The method according to claim 15, wherein transforming comprises an analyzing the wireless signal and providing a digitized signal comprising I/Q sampled values.

17. The method according to claim 16, wherein transforming comprises providing only the algebraic signs of the I and Q components of the I/Q samples, and wherein filtering and detecting are performed based on the algebraic signs instead of the complete samples.

18. The method according to claim 11, wherein detecting comprises determining the active channel or channels based on the determined frequency index or indices.

19. The method according to claim 11, wherein the wireless signal is a long term evolution (LTE) or enhance machine type communication (eMTC) signal and the active channel is a LTE or eMTC physical random access channel (PRACH).

* * * * *